July 5, 1966 T. J. LAVIN 3,259,757

HIGH SPEED ACTIVE TRIGGERING CIRCUIT FOR USE WITH A BINARY

Filed May 20, 1963 2 Sheets-Sheet 1

INVENTOR.
THOMAS J. LAVIN
BY
ATTORNEY

HIGH SPEED ACTIVE TRIGGERING CIRCUIT FOR USE WITH A BINARY

Filed May 20, 1963 2 Sheets-Sheet 2

INVENTOR.
THOMAS J. LAVIN
BY
ATTORNEY

United States Patent Office 3,259,757

Patented July 5, 1966

3,259,757

HIGH SPEED ACTIVE TRIGGERING CIRCUIT FOR USE WITH A BINARY

Thomas J. Lavin, Lodi, N.J., assignor to The Bendix Corporation, Teterboro, N.J., a corporation of Delaware Filed May 20, 1963, Ser. No. 281,571

8 Claims. (Cl. 307—88.5)

This invention relates generally to electrical circuits and in particular to trigger circuits for use with multivibrator circuits which are sometimes referred to as binaries.

Heretofore, trigger circuits used in conjunction with binaries have provided high speed operation of the binary. However, these circuits are limited in utility because they (1) generated noise, (2) were sensitive themselves to noise and were thus falsely triggered, and (3) were subject to "racing" i.e. a continual changing of state without application of a trigger signal.

An object of the present invention is to provide a novel trigger circuit providing faster triggering of a binary than heretofore.

Another object of the invention is to provide a novel trigger circuit which requires very little triggering power, is insensitive to overdrive and to spurious noise.

Another object of the invention is to provide a novel fast trigger circuit which operates only in reply to the trigger signal and does not "race."

Another object of this invention is to provide a novel trigger circuit which may be used with a single stage binary and in circuits having many binary stages such as, for example, shift registers and counters.

Another object of the invention is to provide a novel trigger circuit having a D.C. coupled low input impedance which attenuates stray RF noise and thus avoids spurious triggering.

Another object of the invention is to provide a novel trigger circuit for use in a shift register and providing very fast shifting.

A still further object of the invention is to provide a novel trigger circuit for use in a counter to improve the efficiency of the counter.

These and other objects and features of the invention are pointed out in the following description in terms of the embodiment thereof which is shown in the accompanying drawings. It is to be understood, however, that the drawings are for the purpose of illustration only and are not a definition of the limits of the invention, reference being had to the appended claims for this purpose.

Figure 1:
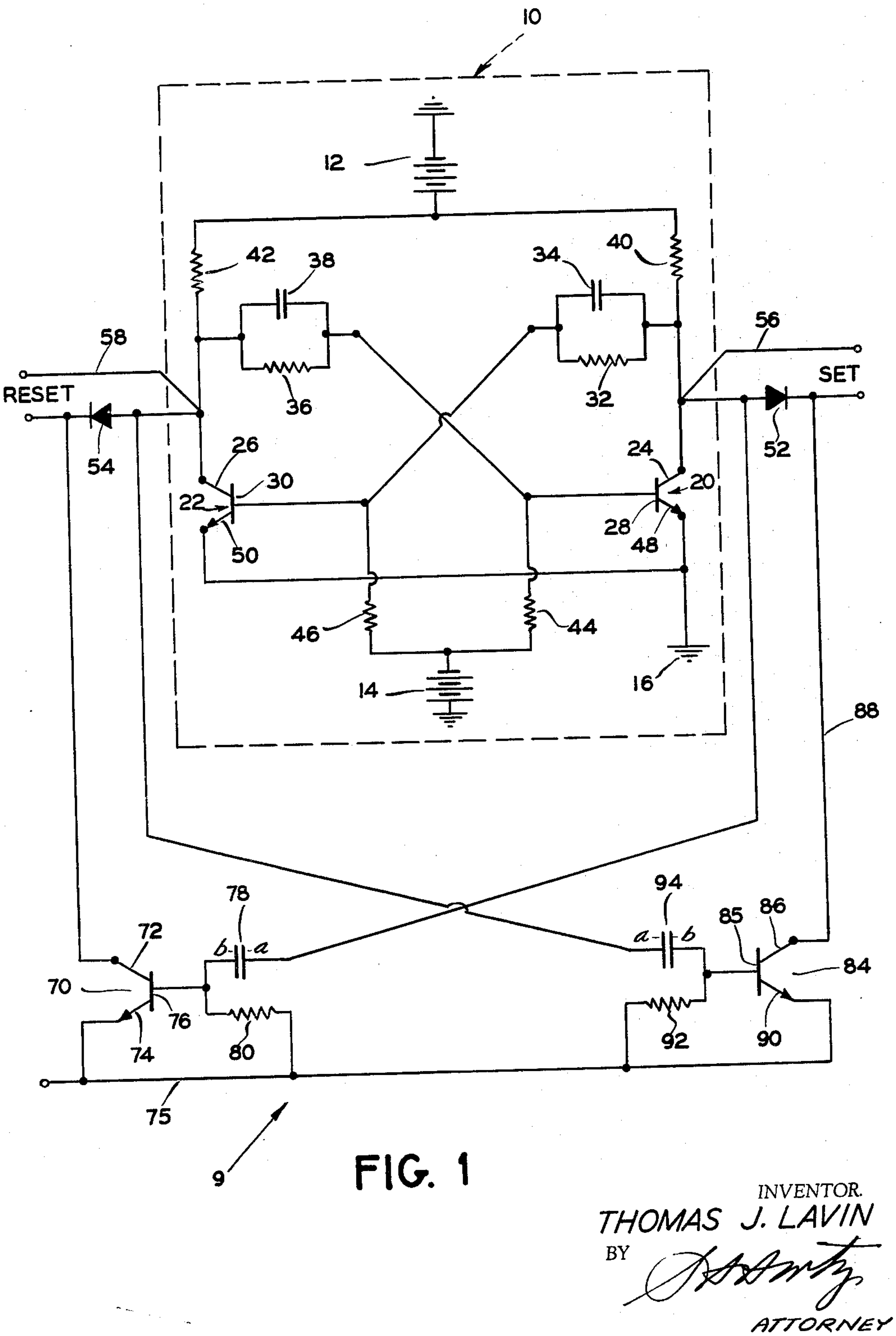
FIGURE 1 is a schematic electrical diagram of a conventional binary with a trigger circuit constructed in accordance with the invention.

Referring to the drawing of FIGURE 1 there is shown a preferred embodiment of a circuit constructed in accordance with the invention. A novel trigger circuit 9 is interconnected with a conventional binary circuit 10. The circuits are powered by voltages from sources shown here as batteries 12 and 14, and are referenced to a ground potential 16. The binary circuit 10 includes a pair of transistors 20 and 22 having their outputs (available at collectors 24 and 26) cross-connected to each other's inputs (i.e. at bases 28 and 30) through a parallel combination of a resistor 32 or 36 and a capacitor 34 or 38. The collectors 24 and 26 are also connected through current limiting resistors 40 and 42 to the source 12; the bases 28 and 30 are connected through resistors 44 and 46 to negative bias supply 14 to provide temperature stabilization and noise immunization. The transistor's emitters 48 and 50 are connected to ground 16.

The binary 10 is triggered by a negative-going signal applied at the collectors 24 and 26 through diodes 52 and 54. The input at diode 52 is designated SET and the input at diode 54 is designated RESET. The output from the binary 10 is provided at the collectors 24 and 26 on conductors 56 and 58 respectively as SET and RESET outputs. Transistor 20 may be termed the SET transistor, and transistor 22 the RESET transistor.

Binary 10 is of a conventional design, reference may be made to any one of the handbooks on transistor circuits for a description of the structure and operation of the binary circuit and various modifications thereof, such as, for example: General Electric Transistor Manual, Liverpool, New York, General Electric Company, 4th edition (1959) cf. chapter 11.

The binary 10 operates as follows. Upon application of a negative-going signal to the SET input through the diode 52, the SET output is rendered low and the RESET output is rendered high; and conversely, upon the application of a negative-going signal to the RESET input, the RESET output is rendered low and the SET output is rendered high. The binary 10 may also receive a complementary input, i.e. a negative going signal applied simultaneously to both inputs. This will cause the binary to change state, i.e. if prior to the application of the negative-going complementary signal, the SET was high and RESET was low, the complementary signal will make the SET low and the RESET high.

The novel trigger circuit of the invention is for use with a conventional binary, such as the binary 10, and controls the complementary input. The trigger circuit comprises a first transistor 70 having its collector 72 connected to the RESET input and its emitter 74 connected to receive complementary input signal applied on a complementary input conductor 75. A base 76 of transistor 70 is crossconnected through a capacitor 78 to the collector 24 of the SET transistor 20, and also through a resistor 80 to the conductor 75 to receive the complementary input signal.

A second transistor 84 is interconnected in an analagous fashion with the SET and RESET transistors 20 and 22, namely: a collector 86 of the second transistor 84 is directly connected by a conductor 88 to the SET input, and an emitter 90 of the transistor 84 is connected to the complementary input conductor 75. A base 85 of the transistor 84 is connected through resistor 92 to the complementary input conductor 75, and crossconnected through a capacitor 94 to the collector 26 of the RESET transistor 22.

The circuit now having been described, its operation will be traced in detail. The operation of the circuit is as follows: consider the binary 10 to be in the RESET condition with the RESET output high, i.e. a positive voltage on output conductor 58, while the SET output is low, i.e. a nominally grounded voltage on output conductor 56. Under this standby condition, plate *a* of the capacitor 78 is grounded, while plate *a* of the capacitor 94 is at the positive output potential of the binary 10. When a positive voltage is applied on the complementary input conductor 75, the capacitor 78 is charged by a current supplied thereon and through the resistor 80 so that a net positive charge appears across the capacitor 78 in the direction from plate *b* to plate *a*. The capacitor 94 also receives charging current through the resistor 92 such that its plate *b* is brought to approximately the same potential as its plate *a*, resulting in no net charge across capacitor 94. Thus, triggering energy is selectively stored in the capacitor 78. During this high voltage condition of the complementary input line 75, current is prevented from flowing through the transistor 84 from base 85 to collector 86. During the negative-going portion of the complementary input signal, the base 76 to the emitter 74 of the transistor 70 becomes forward biased and the capacitor 78 discharges through the base 76 to emitter 74 of transistor 70. This discharging current is amplified by transistor 70 causing current to flow from the high voltage side of the binary 10 through the reset diode 54 and through the transistor 70 from the collector 72 to the emitter 74. Thus a negative-going voltage is applied to the high voltage side of the binary 10. This negative-going voltage signal is capacitively coupled by commutating capacitor 38 to the base of the transistor 20 rendering it nonconducting. In going from a conducting state to a nonconducting state, the voltage at the collector 24 of transistor 20 rises. Thus a positive-going signal is capacitively coupled by capacitor 78 to the base 76 of transistor 70 causing the transistor 70 to conduct more heavily compelling the "pull-down" of the high voltage side of the binary 10.

The rising potential at the collector of transistor 20 is also applied through the capacitive coupling of the capacitor 34 to the base 30 of the transistor 22 rendering it in a conducting state such that the normal latching operation of the binary holds the transistor 22 in the new conducting condition. The binary is therefore now "complemented" such that the RESET output is now low (with the voltage on output conductor 58 at nominal ground) and the SET output is high (with a positive voltage on output conductor 56).

On the next positive excursion of the signal on the complementary input conductor 75 the capacitor 94 receives a net positive charge, and the triggering process is repeated now employing transistors 84 and 22.

Due to the positive feedback around the active transistors during triggering, the energy stored in the triggering capacitors 78 and 94 can be quite small. This permits the use of low capacitance capacitors resulting in short time constants (resistor 80 and capacitors 78; and resistor 92 and capacitor 94) thus providing very high speed operation. The low values of these capacitors also reduces the capacitive loading on the complementary input line and on the binary outputs which results in a faster rise time of the output voltage and a cleaner or sharper output waveform.

There are many different values of circuit parameters for which the circuit shown in FIGURE 1 will function satisfactorily. Since the circuit parameters may vary according to the design for any particular application, the following circuit parameters are included for the circuit of FIGURE 1 by way of example only.

Transistors 20 and 22, 70 and 84: 2N706
Resistors 32 and 36: 620 ohms
Capacitors 34 and 38: 20 pf.
Resistors 40 and 42: 1.5K ohms
Resistors 44 and 46: 4.3K ohms
Diodes 52 and 54: 1N914
Capacitors 78 and 94: 20 pf.
Resistors 80 and 92: 3K ohms
Source of potential 12: 12 volts
Source of potential 14: −12 volts Referring to the drawing of FIGURE 2 there is shown therein an alternative embodiment of the novel trigger circuit. The alternative embodiment, like the embodiment shown in FIGURE 1, is for use with any binary which may or may not be the binary 10 of FIGURE 1. The alternative embodiment is particularly applicable for very high speed operations, for example, up to 18 megacycles.

Figure 2:
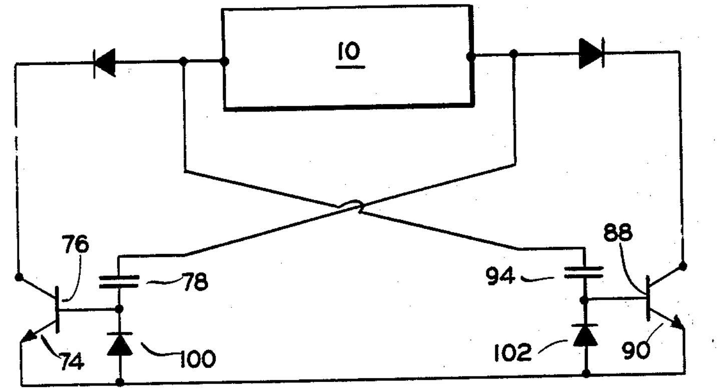
FIGURE 2 is a schematic diagram of an alternative embodiment of the novel trigger circuit of FIGURE 1.

The elements which are common in both FIGURE 1 and FIGURE 2 bear like legends; most common elements behave in analogous or identical fashion in both figures and these elements are not described again. The resistors 80 and 92 of FIGURE 1 are replaced in the FIGURE 2 by diodes 100 and 102 respectively. The use of the diodes 100 and 102 reduces the time required to charge the storage capacitors 78 and 94 and prevent trigger current from bypassing the base to emitter circuit (76 to 74, and 88 to 90) during triggering, thus providing a faster trigger action.

The trigger circuit of the invention has been shown in FIGURES 1 and 2 with a single binary. The trigger circuit may be used in circuits such as counters which use many binaries. In the example of a counter, the output of each binary stage is connected to the complementary input, i.e. through the trigger circuit of a next binary stage. The structure of binary counters are well known and need not be further described.

Figure 3:
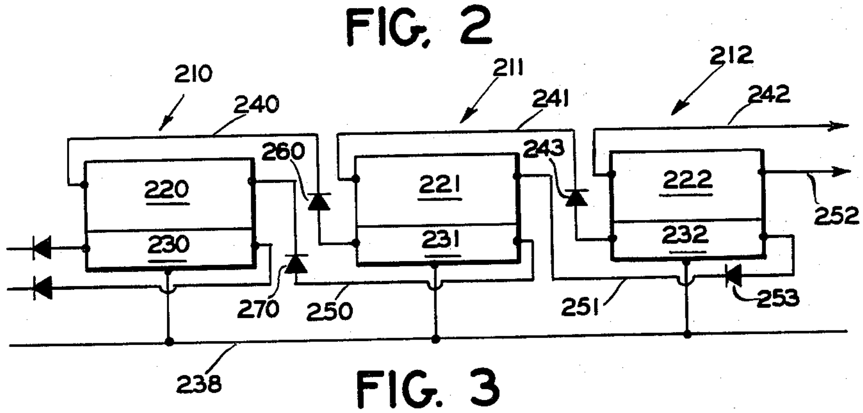
FIGURE 3 is a block diagram of a shift register steering circuit using the trigger circuit of the invention.
Figure 4:
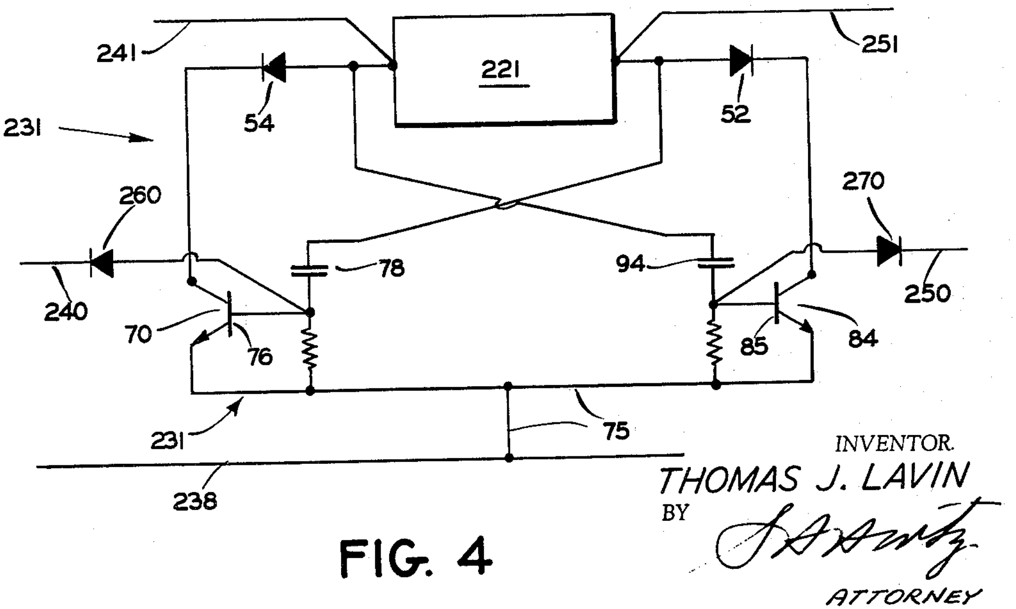
FIGURE 4 is a schematic diagram of a single stage of the shift register of FIGURE 3 showing in schematic detail the trigger circuit of the invention.

Referring to FIGURE 3 there is shown therein a block diagram of a shift register steering circuit using the trigger circuit of the invention, and referring to FIGURE 4 there is shown therein a detailed schematic diagram of the trigger circuit of the invention in a single stage of the shift register of FIGURE 3. FIGURES 3 and 4 are to be considered together and like elements in both figures bear like legend. It will be appreciated that FIGURE 3 shows the interconnections for a typical shift register; that the trigger of FIGURE 4 is similar to the trigger of FIGURE 1; and that like elements in FIGURES 1, 3 and 4 bear like legend.

FIGURE 3 shows three stages 210, 211, and 212 of a shift register; stage 211 is shown in detail in FIGURE 4. The binaries in each stage are represented by blocks 220, 221, and 222 and a trigger circuit in each stage bears the legend 230, 231, and 232. Each trigger circuit 230, 231, and 232 has its complementary input line connected to a shift conductor 238 to receive a shift signal. The output of each stage 210, 211, and 212 is connected to the trigger transistors of the next stage for reasons explained below; and the connections are made through diodes. For illustration, the outputs of binary 220 are connected through conductors 240 and 250 and through diodes 260 and 270, respectively, to the bases 76 and 85 of transistors 70 and 84 in the trigger circuit 231 (as shown in FIGURES 3 and 4). Output from binary 221 is connected by conductors 241 and 251 through diodes 243 and 253 to the trigger circuit 232 of the next stage 212. Output from binary 222 is connected by conductors 242 and 252 through diodes (not shown) to the trigger circuit of the next stage (not shown).

The additional diodes in each trigger stage (in stage 211 these are diodes 260 and 270) allow complementary trigger action only when the preceding stage (i.e. 210) is in the opposite condition to the stage under consideration. Because of the high speed operation of the circuit, the shift operation is essentially synchronous and speed is limited by the time constant in changing the storage capacitors (capacitors 78 and 94 in FIGURE 4).

With the described apparatus, there is implemented a very high speed shift register. The only modification made for the triggering or steering circuit is the addition of two diodes which are directly connected to the appropriate outputs of the preceding stage and serve to qualify the trigger circuit.

The trigger circuit and binary have been shown with NPN transistors. As is well known in the art, the circuit will function equally satisfactorily with PNP transistors. The binary 10 is chosen as an example of any prior art or conventional binary. It should be expressly understood that binaries having different details in their design may be used without departing from the scope of the invention which relates primarily to the trigger circuit for use with a binary.

The trigger circuit has been shown activated by a negative-going signal since NPN transistors are used in the circuit. It should be understood that a positive-going signal may be used to activate the trigger circuit when PNP transistors are used. The signal triggering the binary must be of the same polarity going direction as the signal activating the trigger circuit.

In summary, there has been shown a trigger circuit which employs regenerative feedback and which provides a low input impedance on the complementary input conductor. As a consequence of these two features, the circuit requires very little trigger power, and is insensitive to spurious noise and "a runaway trigger" condition. Furthermore, the circuit is not critical in regard to overdrive and should an overdrive signal be applied, its trigger is not delayed. Finally, the invention describes a novel trigger circuit which provides fast triggering of a binary and gives an output with a good clean waveform. Typical application and modification have also been shown.

What is claimed is:

1. A trigger circuit for use with a binary of the kind having SET and RESET inputs and changing state in response to a predetermined polarity going trigger signal, comprising first and second transistors connected respectively to the SET and RESET inputs of the binary, means connected to the transistors for applying a given polarity going complementary input signal thereto, capacitors connected to the input signal means and connecting the first and second transistors respectively to the RESET and SET inputs of the binary, said capacitors being connected and arranged to receive a charge from the input signal means prior to an excursion of the signal in a given polarity sense and then discharging through at least one transistor rendering said transistor in a conducting state immedately subsequent to the given polarity excursion of said input signal to apply the predetermined polarity trigger signal to the binary.

2. A trigger circuit for use with a binary of the kind having SET and RESET inputs and changing state by a negative-going trigger signal, comprising first and second transistors connected respectively to the SET and RESET inputs of the binary, means connected to the transistors for applying complementary input signals thereto, capacitors connected to the input signal means and connecting the first and second transistors respectively to the RESET and SET inputs of the binary, said capacitors being connected and arranged to receive a charge from the input signal means prior to a negative excursion of the input signal and then discharging through at least one transistor rendering it in a conducting state immediately subsequent to the negative excursion of the input signal to cause the binary to change state.

3. A trigger circuit for use with a binary of the kind having a SET and a RESET input, comprising first and second transistors each having a base, a collector, and an emitter, a pair of diodes directly connecting the collectors of the first and second transistors to the SET and RESET inputs respectively of the binary, a pair of capacitors connecting the bases of the first and second transistors to the RESET and SET inputs respectively of the binary, means connecting the base and the emitter of each of the first and second transistors, and means for applying a trigger signal to the emitters of the first and second transistors.

4. A trigger circuit for use with a binary of the kind having a pair of transistors with bases and collectors resistively and capacitively cross-connected, comprising first and second transistors each having a base, a collector, and an emitter, a pair of diodes directly connecting the collectors of the first and second transistors to the collectors of the transistors in the binary, a pair of capacitors crossconnecting the bases of the first and second transistors to the collectors of the transistors in the binary, and a resistor connecting the base and the emitter of each of the first and second transistors, and means for applying a trigger signal to the emitters of the first and second transistors.

5. In the trigger circuit of the kind defined in claim 4, the first and second transistors being NPN transistors and the pair of diodes being connected and arranged to be back-biased from the collectors of said first and second transistors to the collectors of the pair of transistors in the binary.

6. A trigger circuit for use with a binary of the kind having a pair of transistors with bases and collectors resistively and capacitively crossconnected, comprising first and second transistors each having a base, a collector, and an emitter, a pair of diodes directly connecting the collectors of the first and second transistors to the collectors of the transistors in the binary, a pair of capacitors crossconnecting the bases of the first and second transistors to the collectors of the transistors in the binary, and a diode connecting the base and emitter of each of the first and second transistors, and means for applying a trigger signal to the emitters of the first and second transistors.

7. A trigger circuit for use with a binary of the kind having a SET and a RESET input, comprising first and second transistors each having a base, a collector, and an emitter, a pair of diodes directly connecting the collectors of the first and second transistors to the SET and RESET inputs respectively of the binary, a pair of capacitors connecting the bases of the first and second transistors to the RESET and SET inputs respectively of the binary, a resistor connecting the base and the emitter of each of the first and second transistors, and means for applying a trigger signal to the emitters of the first and second transistors.

8. In a shift register having at least two binary stages adapted to be collector triggered at SET and RESET inputs, a trigger circuit associated with each binary stage and having first and second transistors each with a base, a collector, and an emitter, a first pair of diodes directly connecting the collectors of the first and second transistors of each trigger circuit to the SET and RESET inputs, respectively, of the associated binary stage, capacitors connecting the bases of the first and second transistors of each trigger circuit to the RESET and SET inputs, respectively, of the associated binary stage, a resistor connecting the base and emitter of each of the first and second transistors in each trigger circuit, means for applying a trigger signal to the emitters of the first and second transistors of each trigger circuit, and a second pair of diodes connecting the bases of the first and second transistors of each trigger circuit to the outputs of the binary in the preceding stage.

References Cited by the Examiner

UNITED STATES PATENTS

| | | | |
|---|---|---|---|
| 2,906,894 | 9/1959 | Harris | 307—88.5 |
| 3,114,049 | 12/1963 | Blair | 307—88.5 |
| 3,131,317 | 4/1964 | Yee | 307—88.5 |
| 3,187,200 | 6/1965 | Gardner et al. | 307—88.5 |
| 3,193,695 | 7/1965 | Monohan | 307—88.5 |

OTHER REFERENCES

RCA Computer Transistor and Tunnel Diode Application Circuits, Jan. 19, 1962, Sheet No. 3, "10 McFlip Flop Utilizing Type 2N645."

JOHN W. HUCKERT, *Primary Examiner.*

ARTHUR GAUSS, *Examiner.*

J. D. CRAIG, *Assistant Examiner.*